United States Patent [19]

Parekh et al.

[11] Patent Number: 5,387,625
[45] Date of Patent: Feb. 7, 1995

[54] WATERBORNE COATING COMPOSITION FOR METAL CONTAINERS

[75] Inventors: Girish G. Parekh, Libertyville; Perumal T. Pillai, Lindenhurst; Devasia J. Ponmankal, Chicago, all of Ill.

[73] Assignee: The Dexter Corporation, Windsor Locks, Conn.

[21] Appl. No.: 63,091

[22] Filed: May 18, 1993

[51] Int. Cl.$^6$ .......................... C08K 3/20; C08L 63/02
[52] U.S. Cl. ................................... 523/404; 427/386; 428/418
[58] Field of Search .................. 523/404; 427/386; 428/418

[56] References Cited

U.S. PATENT DOCUMENTS

| | | | |
|---|---|---|---|
| 3,943,187 | 3/1976 | Wu | 260/837 R |
| 3,997,694 | 12/1976 | Wu | 428/35 |
| 4,212,781 | 7/1980 | Evans et al. | 260/29.4 UA |
| 4,302,373 | 11/1981 | Steinmetz | 260/29.3 |
| 4,355,122 | 10/1982 | Fan | 523/423 |
| 4,374,875 | 2/1983 | Fan | 427/386 |
| 4,446,258 | 5/1984 | Chu et al. | 523/406 |
| 4,480,058 | 10/1984 | Ting et al. | 523/404 |
| 4,638,038 | 1/1987 | Salensky | 525/533 |
| 4,954,553 | 9/1990 | Johnson et al. | 524/376 |
| 4,963,602 | 10/1990 | Patel | 523/403 |
| 5,010,132 | 4/1991 | Morinaga et al. | 524/601 |

OTHER PUBLICATIONS

J. T. K. Woo et al., "Synthesis and Characterization Of Water-Reducible Graft Epoxy Copolymers" *J. Coat. Tech.* 54 (689) (1982), pp. 41–55.

R. N. Johnson et al., "Water-Borne Phenoxy Resins Low VOC Coatings with Excellent Toughness, Flexibility and Adhesion", Water-Borne and Higher Solids Coating Symposium, Feb. 3–5, 1988, New Orleans, La., pp. 443–461.

*Primary Examiner*—Melvyn I. Marquis
*Assistant Examiner*—D. Aylward
*Attorney, Agent, or Firm*—Marshall, O'Toole, Gerstein, Murray & Borun

[57] ABSTRACT

A waterborne coating composition for metal containers, a method of coating a metal container, and a metal article useful as a food or beverage container are disclosed. The waterborne coating composition is a thermoplastic material and comprises: (a) a flexible, high molecular weight epoxy resin; (b) a medium molecular weight epoxy resin; (c) a resin having pendant carboxylic acid groups; (d) a fugitive base; and an aqueous carrier, wherein the waterborne coating composition includes about 0.5 to about 2.5 pounds volatile organic content per gallon of the composition, minus water.

31 Claims, 1 Drawing Sheet

WATERBORNE COATING COMPOSITION FOR METAL CONTAINERS

FIELD OF THE INVENTION

The present invention relates to a waterborne coating composition for a metal container that, after curing, demonstrates excellent adhesion and flexibility and does not adversely affect a food or beverage packaged in the metal container; to a method of coating a metal container; and to a metal article, like a metal can or container, having at least one surface coated with an adherent layer of the cured coating composition. A waterborne coating composition comprises: (a) a flexible, high molecular weight (HMW) epoxy resin; (b) a medium molecular weight (MMW) epoxy resin; (c) a resin having pendant carboxylic acid groups; (d) a fugitive base; and an aqueous carrier, wherein the waterborne coating composition includes about 0.5 to about 2.5 pounds volatile organic content (VOC) per gallon of the composition, minus water.

BACKGROUND OF THE INVENTION

It is well-known that an aqueous solution in contact with an untreated metal substrate can result in corrosion of the untreated metal substrate. Therefore, a metal article, such as a metal container for a water-based product, like a food or beverage, is rendered corrosion resistant in order to retard or eliminate interactions between the water-based product and the metal article. Generally, corrosion resistance is imparted to the metal article, or to a metal substrate in general, by passivating the metal substrate, or by coating the metal substrate with a corrosion-inhibiting coating.

Investigators continually have sought improved coating compositions that reduce or eliminate corrosion of a metal article and that do not adversely affect an aqueous product packaged in the metal article. For example, investigators have sought to improve the imperviousness of the coating in order to prevent corrosion-causing ions, oxygen molecules and water molecules from contacting and interacting with a metal substrate. Imperviousness can be improved by providing a thicker, more flexible and more adhesive coating, but often, improving one particular advantageous property is achieved at the expense of another advantageous property.

In addition, practical considerations limit the thickness, adhesive properties and flexibility of a coating applied to a metal substrate. For example, thick coatings are expensive, require a longer cure time, can be esthetically unpleasing and can adversely affect the process of stamping and molding the coated metal substrate into a useful metal article. Similarly, the coating should be sufficiently flexible such that the continuity of the coating is not destroyed during stamping and molding of the metal substrate into the desired shape of the metal article.

Investigators also have sought coatings that possess chemical resistance in addition to corrosion inhibition. A useful coating for the interior of a metal container must be able to withstand the solvating properties of a product packaged in the metal container. If the coating does not possess sufficient chemical resistance, components of the coating can be extracted into the packaged product and adversely affect the product. Even small amounts of extracted coating components can adversely affect sensitive products, like beer, by imparting an off-taste to the product.

Conventionally, organic solvent-based coating compositions were used to provide cured coatings having excellent chemical resistance. Such solvent-based compositions include ingredients that are inherently water insoluble, and thereby effectively resist the solvating properties of water-based products packaged in the metal container. However, because of environmental and toxicological concerns, and in order to comply with increasingly strict governmental regulations, an increasing number of coating compositions are water based. The water-based coating compositions include ingredients that are water soluble or water dispersible, and therefore cured coatings resulting from water-based coating compositions often are more susceptible to the solvating properties of water.

Epoxy-based coatings and polyvinyl chloride-based coatings have been used to coat the interior of metal containers for foods and beverages because these coatings exhibit an acceptable combination of adhesion to a metal substrate, flexibility, chemical resistance and corrosion inhibition. However, epoxy-based coatings and polyvinyl chloride-based coatings have serious disadvantages that investigators still are attempting to overcome.

For example, coatings based on polyvinyl chloride or related halide-containing vinyl polymers, like polyvinylidene chloride, possess the above-listed advantageous properties of chemical resistance and corrosion inhibition, and are economical. However, curing a polyvinyl chloride or related halide-containing vinyl polymer can generate toxic monomers, such as vinyl chloride, a known carcinogen. In addition, the disposal of a halide-containing vinyl polymer, such as by incineration, also can generate toxic monomers. The generated vinyl chloride thereby poses a potential danger to workers in metal can manufacturing plants, in food processing and packaging plants, and at disposal sites. Disposal of polyvinyl chloride and related polymers also can produce carcinogenic dioxins and environmentally-harmful hydrochloric acid.

Government regulators therefore are acting to eliminate the use of polyvinyl chloride-based coating compositions that contact food, and thereby eliminate the environmental and health concerns associated with halide-containing vinyl polymers. Presently however, polyvinyl chloride-based compositions are still the predominant coating used to coat the interior of food and beverage containers.

To overcome these environmental concerns, epoxy-based coating compositions recently have been used to coat the interior of food and beverage containers. However, epoxy-based coatings also possess disadvantages. For example, epoxy-based coating compositions are more expensive than polyvinyl chloride-based coating compositions.

A greater disadvantage of epoxy-based coating compositions is the presence of relatively high amounts of a phenolic resin or an aminoplast in the composition. Phenolic resins and aminoplasts typically are condensates of formaldehyde with a phenol, a urea, a melamine or benzoguanamine. The phenolic resin or aminoplast is included in the epoxy-based coating composition primarily to crosslink the epoxy resin. Both types of crosslinking agents include free residual formaldehyde or generate free formaldehyde during cure of the epoxy-based composition. The amount of free formaldehyde often is sufficient to adversely affect the taste of various products packaged in a container coated with a cured epoxy-based composition. For example, a product such as beer is very sensitive to low concentrations of free formaldehyde, and taste of the beer is adversely affected. In addition, free formaldehyde poses a health hazard in the work place. Presently, strict exposure limits are set to protect workers from exposure to formaldehyde.

Various patents disclose waterborne coating compositions for metal cans. In general, the prior patents disclose coating compositions including waterborne thermoset resins for use as can coatings. The thermoset resins can be formulated with a crosslinking agent to provide crosslinked films during cure, as demonstrated by the resistance of the cured coating to the effects of organic solvents such as methyl ethyl ketone. These waterborne resins include significant amounts of organic solvents. Typically, the thermoset resins include a high volatile organic content (VOC) of about 3 to 5 pounds per gallon (lb/gal) of the resin, or of the composition, minus water. The organic solvents often are essential to help emulsify the thermoset resin and to improve emulsion stability. The presence of organic solvents in a coating composition also improve film coalescence, film flow-out and substrate wetting.

Recently, waterborne phenoxy resins having a VOC of about 1.5 to about 2.5 lb/gal minus water were disclosed. These waterborne phenoxy resins are high molecular weight thermoplastic resins that are difficult to process and are too expensive for practical commercial use. In addition, because these phenoxy resins are thermoplastic resins, cured coatings derived therefrom are not resistant organic solvents, although the cured coatings often provide sufficient barrier properties to water-based compositions for use as can coatings.

Investigators therefore have sought a waterborne coating composition for the interior of food and beverage containers that retains the advantageous properties of adhesion, flexibility, chemical resistance and corrosion inhibition, and that is economical and does not adversely affect the taste or other aesthetic properties of sensitive food and beverages packaged in the container. Investigators especially have sought a waterborne coating composition that demonstrates these advantageous properties and also reduces the environmental and toxicological concerns associated with organic solvents.

Investigators prefer a thermosetting coating composition because such compositions are easier to handle, require a lower VOC, and provide better chemical resistance than thermoplastic coating compositions. A thermosetting coating composition however requires the presence of a crosslinking agent in order to provide a cured coating having a sufficient molecular weight. Generally, the crosslinking agent is a phenolic resin, an aminoplast or a similar resin. Therefore, investigators have sought a low VOC coating composition for food and beverage containers (1) that meets increasingly strict environmental regulations, and (2) has corrosion inhibition properties at least equal to existing organic solvent-based or high VOC coating compositions. Such a waterborne coating composition would satisfy a long felt need in the art.

A present waterborne coating composition comprises a flexible HMW epoxy resin, a MMW epoxy resin, a resin having pendant carboxylic acid groups and a fugitive base. A present waterborne coating composition does not require a crosslinking agent, like a phenolic resin or an aminoplast, and therefore can be used as a can coating composition for taste-sensitive products, like beer. A present waterborne coating composition includes only about 0.5 to about 2.5 pounds VOC per gallon of the composition, minus water, yet demonstrates excellent storage stability, composition flow out, substrate wetting, and cured coating properties, such as adhesion, hardness and flexibility.

A thermoplastic, waterborne coating composition of the present invention has a very low VOC, and therefore substantially overcomes the environmental and toxicological problems associated with an organic solvent-based coating composition or a high VOC coating composition (i.e., including at least 2.5 pounds VOC per gallon of composition, minus water). A present waterborne coating composition also can be free of a crosslinking agent, like a phenolic resin or an aminoplast, thereby eliminating the environmental and toxicological concerns associated with formaldehyde, and eliminating an ingredient included in the waterborne coating composition that can adversely affect the taste of a food or beverage that contacts the cured coating composition.

Prior investigators have studied waterborne epoxy resin-based compositions for application to metal substrates. Many of these investigators sought epoxy resin-based aqueous compositions that provide a sufficiently flexible cured coating such that the coated metal substrate can be deformed without destroying film continuity. Often, conventional epoxy resins provide a rigid cured film thereby making it difficult to impossible to coat the metal substrate prior to deforming, i.e., shaping, the metal substrate into a metal article, like a metal can. Coating a metal substrate prior to shaping the metal substrate is the present standard industrial practice.

For example, Johnson et al. U.S. Pat. No. 4,954,553 discloses an aqueous coating composition comprising a carboxyl-bearing phenoxy resin and a resin that is soft in comparison to the phenoxy resin, like a polyester. The carboxyl-bearing phenoxy resin is prepared by grafting ethylenically unsaturated monomers to the phenoxy resin. The coating composition provides flexible cured coatings. Fan U.S. Pat. Nos. 4,355,122 and 4,374,875 disclose a waterborne phenolic composition wherein an ethylenically unsaturated monomer including a carboxyl group is grafted onto a phenoxy resin by standard free radical polymerization techniques, then the carboxyl groups are neutralized by a base.

Chu et al. U.S. Pat. No. 4,446,258 discloses an aqueous coating composition comprising: (1) the neutralized reaction product of an epoxy resin with a preformed addition polymer containing carboxyl groups, and (2) an acrylic or vinyl polymer, which is prepared either in situ or added to the composition, and which is different from the preformed addition polymer. Other patents that disclose aqueous coating compositions comprising an epoxy resin and an acrylic polymer include Evans et al. U.S. Pat. No. 4,212,781 and Steinmetz U.S. Pat. No. 4,302,373. Evans et al. U.S. Pat. No. 4,212,781 discloses grafting an acrylic monomer or monomer blend to an epoxy resin to provide a polymeric blend including unreacted epoxy resin, an acrylic resin and a graft polymer of the acrylic resin and epoxy resin. Steinmetz U.S. Pat. No. 4,302,373 discloses a waterborne coating composition consisting essentially of the neutralized reaction product of a modified polyepoxide (e.g., an ester or ether) or a phenolic and a carboxyl-functional polymer.

Patel U.S. Pat. No. 4,963,602 discloses aqueous coating compositions including an epoxy resin, an acrylic resin, a phenoxy resin, a novolac resin and a resol resin. Wu U.S. Pat. Nos. 3,943,187 and 3,997,694 disclose an organic solvent-based coating composition consisting essentially of a blend of an acrylic polymer having hard and soft segments and an epoxy resin. Salensky U.S. Pat. No. 4,638,038 discloses modified phenoxy resins wherein anhydrides or polycarboxylic acids are grafted onto a phenoxy resin. Morinaga et al. U.S. Pat. No. 5,010,132 discloses a coating composition for a metal can comprising: (1) fine particles a polyester resin including terephthalic acid and isophthalic acid, and (2) a surfactant.

Publications disclosing a water-based coating compositions including an epoxy resin and an acrylic resin include:

- J. T. K. Woo et al., "Synthesis and Characterization of Water-Reducible Graft Epoxy Copolymers", *J. Coat. Tech.*, 54 (1982), pp. 41–55; and
- R. N. Johnson et al., "Water-Borne Phenoxy Resins Low VOC Coatings with Excellent Toughness, Flexibility and Adhesion", presented at the Water-Borne and Higher-Solid Coatings Symposium, Feb. 3–5, 1988 in New Orleans, La.

The above-identified patents and publications disclose waterborne coating compositions comprising an epoxy resin and an acrylic resin. The patents and publications do not disclose a waterborne coating composition comprising a flexible HMW epoxy resin; a MMW epoxy resin; and a resin having pendant carboxylic acid groups, wherein the waterborne coating composition includes about 0.5 to about 2.5 pounds VOC per gallon (minus water), and does not require a phenolic or an aminoplast crosslinking agent.

Although the above-identified patents and publications disclose coating compositions for the interior of a food or beverage container, the patents and publications do not disclose a waterborne epoxy-based composition that includes a MMW epoxy resin and that is essentially free a phenolic or an aminoplast crosslinking agent and, which, after curing, demonstrates: (1) excellent flexibility; (2) excellent adhesion; (3) excellent chemical resistance and corrosion inhibition; (4) no ability to impart an adverse taste to a product packaged in the container; and (5) reduced environmental and toxicological concerns.

As an added advantage, it is envisioned that a present waterborne coating composition can be used both on can ends and on can bodies, thereby obviating the use of two different coating compositions by container manufacturers. Furthermore, a present waterborne coating composition exhibits sufficient clarity, hardness and mar resistance after curing for use as a coating on the exterior of a metal container. Accordingly, because of improved chemical and physical properties and because of the wide range of cure temperatures, a waterborne coating composition of the present invention has a more universal range of applications, such as for the interior coating of a metal container for food or beverage products or for the exterior coating of a metal container; overcomes the environmental and toxicological concerns associated with a solvent-based or a high VOC coating composition; and overcomes disadvantages, such as adversely affecting the taste of a beverage, presented by prior epoxy-based coatings that included a phenolic resin or an aminoplast crosslinking agent.

SUMMARY OF THE INVENTION

The present invention is directed to a waterborne coating composition that, after curing, effectively inhibits corrosion of a metal substrate; does not adversely affect products packaged in a container having an interior surface coated with the cured composition; and exhibits excellent flexibility, chemical resistance and adhesion. A waterborne coating composition of the present invention can be used both on can ends and can bodies, and on container interiors and exteriors. A waterborne coating composition effectively inhibits corrosion of ferrous and non-ferrous metal substrates when the composition is applied to a surface of the metal substrate, then cured for a sufficient time and at a sufficient temperature to provide a crosslinked coating. A waterborne coating composition does not require a phenolic resin or an aminoplast crosslinking agent. However, a cured and crosslinked coating nevertheless demonstrates sufficient chemical and physical properties for use on the interior of containers used to package foods and beverages.

A present waterborne coating composition overcomes numerous disadvantages associated with prior epoxy resin-based compositions, and comprises: (a) a flexible HMW epoxy resin; (b) a MMW epoxy resin; (c) a resin having pendant carboxylic acid groups; (d) a fugitive base; and a carrier comprising water and a volatile organic compound. A waterborne coating composition includes about 0.5 to about 2.5 pounds VOC per gallon of the composition, minus water, and the waterborne coating composition does not require a phenolic resin or an aminoplast crosslinking agent. The VOC of the composition is measured on a minus water basis. Therefore, the VOC is determined by subtracting the water content from the composition, then determining the VOC (in lb/gal) of the remaining nonaqueous portion of the composition.

In particular, the present waterborne coating composition comprises: (a) about 25% to about 90%, by weight of nonvolatile material, of a flexible HMW epoxy resin having an epoxy equivalent weight (EEW) of about 7,000 to about 20,000, and preferably about 8,000 to about 18,000; (b) about 5% to about 70%, by weight of nonvolatile material, of a MMW epoxy resin having an EEW of about 1,500 to about 5,000, and preferably about 2,000 to about 4,000; and (c) about 5% to about 70%, by weight of nonvolatile material, of a resin having pendant carboxylic acid groups, wherein the carboxylic acid groups are present in an amount of about 0.7 to about 5.5 meq/gm (milliequivalents per gram) of the resin; and (d) a fugitive base, like a tertiary amine, in an amount sufficient to neutralize about 20% to about 100% of the stoichiometric amount of the pendant carboxylic acid groups, in an aqueous carrier. A present waterborne coating composition optionally can include: (e) 0% to about 10%, by weight of nonvolatile material, of a polymeric diol, and (f) 0% to about 20%, by weight of nonvolatile material, of a crosslinking agent, like a phenolic resin or an aminoplast.

In particular, a flexible HMW epoxy resin included in a waterborne coating composition comprises and is prepared from: (1) a liquid epoxy resin, (2) a carboxylic acid-terminated linear polymer, and (3) a dihydric phenol. The carboxylic acid-terminated linear polymer provides a flexible segment in the flexible HMW epoxy resin. Preferably, the carboxylic acid-terminated linear polymer is hydrophobic in nature and comprises an aromatic dicarboxylic acid. A hydrophilic carboxylic acid-terminated linear polymer includes an aliphatic dicarboxylic acid and is essentially free of an aromatic dicarboxylic acid.

A flexible HMW epoxy resin includes a sufficient amount of a carboxylic acid-terminated linear polymer, typically about 5% to about 25% by weight, to provide a flexible HMW epoxy resin having a glass transition temperature (Tg) of about 30° C. to about 100° C. A resin including pendant carboxylic acid groups typically is an acrylic polymer, either a homopolymer or a copolymer including, for example, acrylic acid and styrene, ethylene or similar vinyl monomers.

A waterborne coating composition includes only about 0.5 to about 2.5 pounds VOC per gallon minus water of the composition. Accordingly, toxicological and environmental problems are minimized. A waterborne coating composition of the present invention is a stable composition even though the VOC is very low in comparison to prior compositions, and the composition exhibits sufficient film coalescence, film flow out and substrate wetting to successfully coat a metal substrate.

A present waterborne coating composition does not require a phenolic resin and an aminoplast that conventionally are used to crosslink epoxy-based compositions. The waterborne coating composition can include 0% to 20%, by weight of nonvolatile material, of such an optional crosslinking agent. However, a present waterborne coating composition typically is essentially free of a phenolic resin or an aminoplast. As used here and hereinafter, the term "essentially free of a phenolic resin and an aminoplast" is defined as a composition including 0% to about 0.5%, and preferably 0% to about 0.25%, by weight of nonvolatile material, of a phenolic resin, an aminoplast, a similar crosslinking agent, such as carbodiimide compounds, melamine resins, urea resins, or urea-formaldehyde compounds, or mixtures thereof. At this level, the phenolic resin, aminoplast or similar crosslinking agent does not adversely affect a waterborne coating composition, or a cured coating resulting therefrom, and does not adversely affect a product, like a food or beverage, that contacts the cured coating.

Components (a) through (d), and (e) and (f) if present, are dispersed in an aqueous carrier such that a waterborne coating composition includes about 10% to about 40%, and preferably about 15% to about 35%, by weight of the total composition, of nonvolatile components. To achieve the full advantage of the present invention, a waterborne coating composition includes about 15% to about 30%, by weight of the total composition, of nonvolatile components. Other optional components, such as a pigment, a filler, or an additive to enhance composition esthetics or performance, also can be included in the composition, and accordingly increase the weight percent of total nonvolatile material in the composition to above about 40% by weight of the total waterborne coating composition. A waterborne coating composition also can include up to 2.5 pounds VOC per gallon (minus water) to assist in dispersing or emulsifying composition ingredients or to improve application of the waterborne coating composition to a substrate. A waterborne coating composition typically includes about 1 to about 2 pounds VOC per gallon (minus water).

As used here and hereinafter, the term "waterborne coating composition" is defined as a coating composition including a flexible HMW epoxy resin; a MMW epoxy resin; a resin having pendant carboxylic acid groups; a fugitive base; an optional polymeric diol, phenolic resin or aminoplast; and any other optional ingredients dispersed in the aqueous carrier. The term "cured coating composition" is defined as an adherent polymeric coating resulting from curing a waterborne coating composition.

Therefore, one important aspect of the present invention is to provide a waterborne coating composition that effectively inhibits the corrosion of ferrous and nonferrous metal substrates and that has a low VOC. A waterborne coating composition, after application to a metal substrate, and subsequent curing at a sufficient temperature for a sufficient time, provides an adherent layer of a cured coating composition that effectively inhibits corrosion; exhibits excellent flexibility and adhesion to the metal substrate; and does not adversely affect a product, like a food or beverage, that contacts the cured coating composition. Because of these advantageous properties, a cured coating composition can be used to coat the interior of food and beverage containers and overcome the disadvantages associated with conventional polyvinyl chloride-based compositions and epoxy-based compositions. A cured coating composition comprises the flexible HMW epoxy resin, the MMW epoxy resin, the resin having pendant carboxylic acid groups, and, if present, the polymeric diol, phenolic resin or aminoplast essentially in the amounts these ingredients are present in the waterborne coating composition, expressed as nonvolatile material. The fugitive base is expelled from a waterborne coating composition during the cure cycle.

In accordance with another important aspect of the present invention, a cured coating composition demonstrates excellent flexibility and adhesion to a metal substrate even in the essential absence of a phenolic resin or aminoplast. The excellent adhesion of a cured coating composition to a metal substrate improves the corrosion-inhibiting properties of the coating composition. The excellent flexibility of a cured coating composition facilitates processing of the coated metal substrate into a coated metal article, like in molding or stamping process steps, such that the cured coating composition remains in continuous and intimate contact with the metal substrate. A cured coating composition exhibits excellent chemical resistance and does not adversely affect a food or beverage packaged in a container having an interior surface coated with the cured coating composition. A cured coating composition is sufficiently hard to resist scratching, even when cured at a temperature as low as about 350° F.

In accordance with another important aspect of the present invention, a waterborne coating composition provides a cured coating composition that overcomes the disadvantages of prior epoxy-based coatings and of conventional polyvinyl chloride-based coatings used to coat the interior of containers for food and beverages. A present waterborne coating composition has a low VOC and therefore overcomes the health and environmental concerns associated with prior coating compositions including high VOC. A cured coating composition of the present invention also overcomes the adverse taste imparted to packaged foods and beverages by prior epoxy-based compositions which include high percentages of a phenolic resin or an aminoplast crosslinking agent. In addition, a present waterborne coating composition can be used both the interior and exterior of can bodies and can ends, thereby obviating the need for a container manufacturer to use multiple coating compositions.

These and other aspects and advantages of the present invention will become apparent from the following detailed description of the preferred embodiments.

DETAILED DESCRIPTION OF THE PREFERRED EMBODIMENTS

A waterborne coating composition of the present invention, after curing, provides a cured coating composition that effectively inhibits the corrosion of metal substrates, such as, but not limited to, aluminum, iron, steel and copper. A waterborne coating composition, after curing, also demonstrates excellent adhesion to the metal substrate; excellent chemical resistance and scratch resistance; and excellent flexibility. A cured coating composition does not impart a taste to foods or beverages that contact the cured coating composition.

In general, a present waterborne coating composition comprises: (a) a flexible HMW epoxy resin; (b) a MMW epoxy resin; (c) a resin having pendant carboxylic acid groups; and (d) a fugitive base in an aqueous carrier. A waterborne coating composition optionally can further include: (e) a polymeric diol and (f) a phenolic resin or an aminoplast crosslinking agent. A waterborne coating composition of the present invention includes about 0.5 to about 2.5 pounds VOC per gallon, minus water, of the composition. Preferably, a waterborne coating composition is essentially free of a phenolic resin, an aminoplast or a related crosslinking agent, i.e., the composition includes 0% to about 0.5%, preferably 0% to about 0.25%, by weight of nonvolatile material of (f) a phenolic resin, an aminoplast or a related crosslinking agent. In addition, a present waterborne coating composition can include optional ingredients that improve the esthetics of the composition, that facilitate processing of the composition, or that improve a functional property of the composition. The individual composition ingredients are described in more detail below.

(a) Flexible, High Molecular Weight Epoxy Resin

In accordance with an important feature of the present invention, a waterborne coating composition includes a flexible HMW epoxy resin in an amount of about 25% to about 90%, by weight of nonvolatile material. Preferably, a waterborne composition includes from about 30% to about 75% of a flexible HMW epoxy resin, by weight of nonvolatile material. To achieve the full advantage of the present invention, a waterborne coating composition includes about 35% to about 50% of a flexible HMW epoxy resin, by weight of nonvolatile material.

A flexible HMW epoxy resin imparts flexibility to a cured coating composition thereby allowing a waterborne coating composition to be applied to a metal substrate and cured prior to shaping the metal substrate into a metal article. The flexibility imparted to a cured coating composition overcomes rigidity problems associated with prior epoxy-based compositions, and also allows a waterborne coating composition to be essentially free of a phenolic resin, aminoplast or similar crosslinking agent which often are included in a coating composition to provide flexibility. A flexible HMW epoxy resin also lowers the glass transition temperature (Tg) of an uncured coating composition, improves flow of a waterborne coating composition during cure, and lowers the viscosity of a waterborne coating composition.

A flexible HMW epoxy resin is prepared from: (1) a liquid epoxy resin having an EEW of about 150 to about 300, (2) a carboxylic acid-terminated linear polymer and (3) a dihydric phenol. These ingredients are interacted to provide a flexible HMW epoxy resin having an EEW of about 7,000 to about 20,000, and preferably of about 8,000 to about 18,000. A flexible HMW epoxy resin has a weight average molecular weight ($M_w$) of about 20,000 to about 50,000, and preferably about 30,000 to about 40,000; and a number average molecular weight ($M_n$) of about 5,000 to about 20,000, preferably about 10,000 to about 15,000.

The carboxylic acid-terminated linear polymer is present in a sufficient amount to provide a flexible HMW epoxy resin having a Tg of about 30° C. to about 100° C. Typically, the carboxylic acid-terminated linear polymer is present at about 5% to about 25%, and preferably about 5% to about 20%, by weight of the flexible HMW epoxy resin. However, by altering the identity of the ingredients comprising the carboxylic acid-terminated linear polymers, such as by including aromatic components, the hydrophobicity of the linear polymer can be changed sufficiently such that either less than 5% or more than 25% by weight of the linear polymer is included in the flexible HMW epoxy resin to provide a resin having a Tg of about 30° to about 100° C.

A carboxylic acid-terminated linear polymer imparts flexibility to the polymer backbone. However, if the carboxylic acid-terminated linear polymer is present in an amount such that the Tg of the flexible HMW epoxy resin is below about 30° C., a cured coating composition is too soft to provide effective chemical resistance and mar resistance. If the carboxylic acid-terminated linear polymer is present in such an amount that the Tg of the flexible HMW epoxy resin is above about 100° C., a cured coating composition lacks sufficient flexibility.

Figure 1:
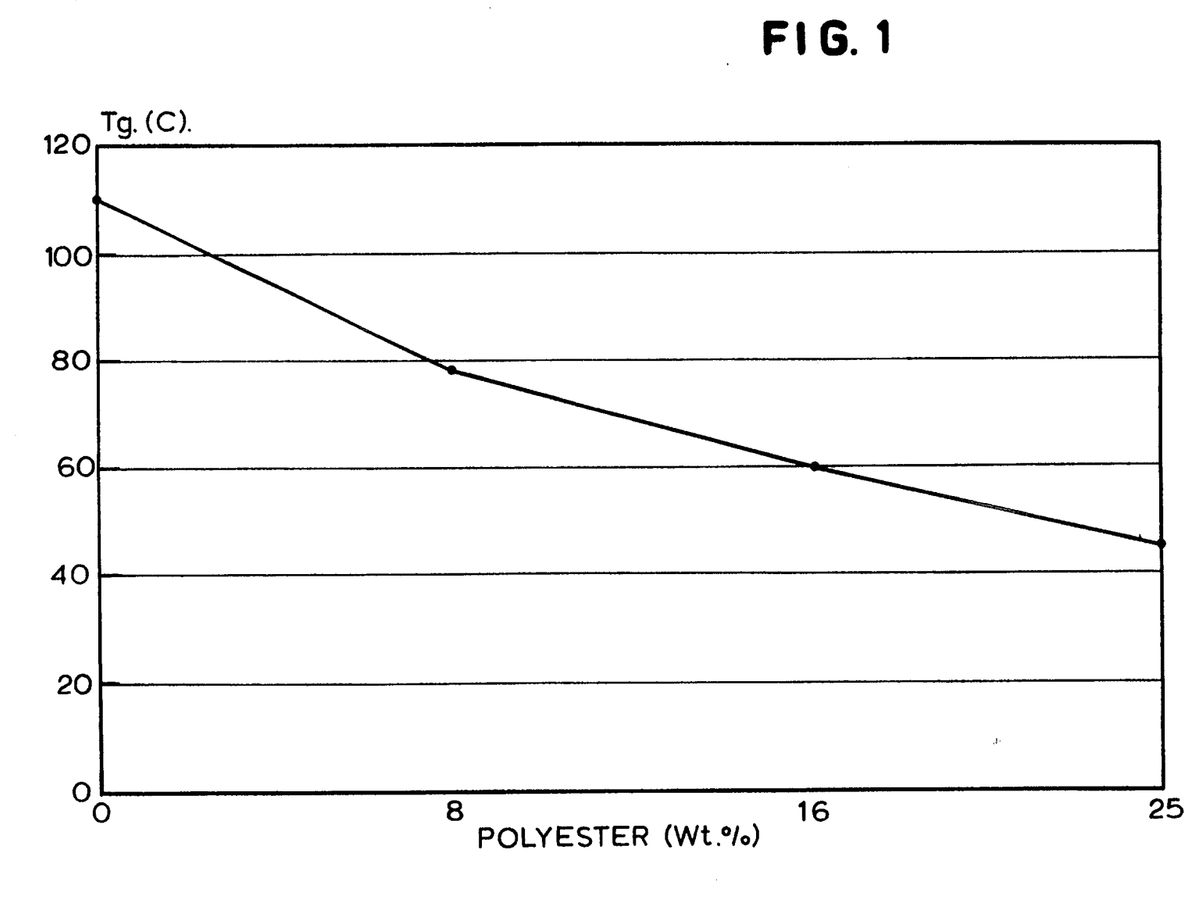
FIG. 1 is a plot of glass transition temperature (Tg°C.) vs. weight percent of linear carboxylic acid-terminated polyester in the flexible high molecular weight epoxy resin.

The effect of increasing the amount of a carboxylic acid-terminated linear polymer in a flexible HMW epoxy resin is illustrated in FIG. 1. If a flexible HMW epoxy resin does not include a carboxylic acid-terminated linear polymer (e.g., polyester), the glass transition temperature (Tg) of the HMW epoxy resin is about 110° C. An epoxy resin having a Tg above about 100° C. provides a cured coating composition that is too rigid and inflexible. If a flexible HMW epoxy resin includes about 25% by weight of the carboxylic acid-terminated linear polymer (e.g., polyester), the Tg is reduced to about 30° C. An epoxy resin having a Tg below about 30° C. provides a cured coating composition that is too soft and has insufficient chemical and mar resistance. If a carboxylic acid-terminated linear polymer is present in an amount greater than about 25% by weight of a flexible HMW epoxy resin, the resulting cured coating composition does not demonstrate sufficient blush resistance.

Accordingly, the amount of carboxylic acid-terminated linear polymer present in a flexible HMW molecular weight epoxy resin typically is about 5% to about 25% by weight of a flexible HMW epoxy resin and provides a flexible HMW epoxy resin having a Tg of about 30° C. to about 100° C. Within this Tg range, a flexible HMW epoxy resin is sufficiently flexible to permit deformation of a cured coating composition without forming cracks, and is sufficiently hard to exhibit excellent chemical and mar resistance. To achieve the full advantage of the present invention, a carboxylic acid-terminated linear polymer is included in a flexible HMW epoxy resin in an amount of about 8% to about 20% by weight of the flexible HMW resin to provide a flexible HMW epoxy resin having a Tg of about 45° C. to about 80° C.

An exemplary carboxylic acid-terminated linear polymer included in a flexible HMW epoxy resin is a polyester and is prepared from a diol and a dicarboxylic acid. The relative amounts of dicarboxylic acid and diol are selected such that a sufficient excess molar amount of the dicarboxylic acid is present in order to provide a carboxylic acid-terminated linear polymer. Preferably, the carboxylic acid-terminated linear polymer is hydrophobic and includes an aromatic dicarboxylic acid or a combination of aromatic and aliphatic dicarboxylic acids.

Exemplary diols used to prepare a carboxylic acid-terminated linear polymer include ethylene glycol, diethylene glycol, triethylene glycol, propylene glycol, dipropylene glycol, hexylene glycol, butylene glycol, neopentyl glycol, trimethylpropane diol, cyclohexane diethanol, a polyethylene or polypropylene glycol having a molecular weight of about 500 or less, and combinations thereof. Triols and polyols are not useful because the resulting carboxylic acid-terminated polymer would not be linear.

Exemplary dicarboxylic acids used to prepare a carboxylic acid-terminated linear polymer include aliphatic and aromatic dicarboxylic acids, such as, but not limited to, phthalic acid, isophthalic acid, terephthalic acid, adipic acid, malonic acid, 2,6-naphthalenedicarboxylic acid, 1,5-naphthalenedicarboxylic acid, hexahydroterephthalic acid, cyclohexanedicarboxylic acid, sebacic acid, azeleic acid, succinic acid, glutaric acid, and combinations thereof. Substituted aliphatic and aromatic dicarboxylic acids, such as halogen or alkyl-substitutes dicarboxylic acids, also are useful.

The diol and the dicarboxylic acid, in correct proportions, are interacted under standard esterification procedures to provide a carboxylic acid-terminated linear polymer having a weight average molecular weight ($M_w$) of about 1,000 to about 10,000 and a number average molecular weight ($M_n$) of about 500 to about 5,000. The following Examples 1 and 2 are provided to more fully illustrate the preparation of a carboxylic acid-terminated linear polymer included in a flexible HMW epoxy resin. In addition to a polyester, the carboxylic acid-terminated linear polymer can be a polymer based on an acrylic, a polybutadiene, a styrene-butadiene copolymer, a styrene-butadiene-acrylonitrile terpolymer, or similar polymers.

EXAMPLE 1

Preparation of Hydrophilic Carboxylic Acid-Terminated Linear Polymer A

Ethylene glycol (120 parts by weight), propylene glycol (54.5 parts by weight), adipic acid (408 parts by weight) and dibutyltin oxide (0.3 parts by weight) were charged into a three-necked vessel equipped with a stirrer, a packed column, a condenser, and a nitrogen inlet. The resulting reaction mixture was stirred and heated slowly to 230° C. under a nitrogen blanket. The reaction mixture was maintained at a temperature of 230° C. under a nitrogen blanket until the acid number of the reaction mixture was about 35 to about 40. The water formed during the esterification reaction was continuously distilled from the vessel. The reaction mixture then was cooled to room temperature, and finally diluted with 15 parts by weight ethylene glycol monobutyl ether to provide a composition including about 56% by weight of an acid-terminated linear polymer. The $M_w$ and $M_n$ of the acid-terminated linear polymer were 5,500 and 3,000, respectively, as determined by gel permeation chromatography.

A hydrophilic carboxylic acid-terminated polyester was prepared by a similar procedure by reacting neopentyl glycol with adipic acid.

EXAMPLE 2

Preparation of Hydrophobic Carboxylic Acid-Terminated Linear Polymer B

Ethylene glycol (291.3 parts by weight), propylene glycol (313.1 parts by weight), adipic acid (1007.7 parts by weight), isophthalic acid (387.7 parts by weight), and dibutyltin oxide (2 parts by weight) were charged into an identical vessel used in Example 1. The resulting reaction mixture was stirred and heated slowly to 230° C. under a nitrogen blanket. The reaction mixture was maintained at a temperature of 230° C. under a nitrogen blanket until the acid number of the reaction mixture was about 38. The water formed during the esterification reaction was continuously distilled from the vessel. The reaction mixture then was cooled to room temperature. The resulting carboxylic acid-terminated linear polymer was a 100% solids resin, and had $M_w$ and $M_n$ of 6,500 and 2,900, respectively, as determined by gel permeation chromatography.

A carboxylic acid-terminated linear polymer then is interacted with a liquid epoxy resin and a dihydric phenol to provide a flexible HMW epoxy resin useful in a present waterborne coating composition. A liquid epoxy resin typically has an EEW of about 150 to about 300 and is also known as the bisglycidyl ether of bisphenol A. Exemplary liquid epoxy resins include EPON 828 or EPON 829, available from Shell Chemical Co., Houston, Tex., and DER-331 or DER-333, available from Dow Chemical Co., Midland, Mich.

A dihydric phenol is selected from a number of dihydric aromatic or polyaromatic compounds. Exemplary classes of dihydric phenol compounds are the bis(hydroxyphenyl)alkanes, the di(hydroxyphenyl) sulfones, the di(hydroxyphenyl) ethers and mixtures thereof. Numerous exemplary dihydric phenols are disclosed in Johnson et al. U.S. Pat. No. 4,954,553, incorporated herein by reference. Preferred dihydric phenols include bisphenol A, bisphenol F, bis(4-hydroxyphenyl)methane, tetrachlorobisphenol A, diphenolic acid, and mixtures thereof. To achieve the full advantage of the present invention, the dihydric phenol is bisphenol A.

A carboxylic acid-terminated linear polymer, a liquid epoxy resin and a dihydric phenol are interacted, in suitable proportions, to provide a flexible HMW epoxy resin having a Tg of about 30° C. to about 100° C. and a $M_w$ of about 20,000 to about 50,000. Typically, the flexible HMW epoxy resin includes about 5% to about 25% by weight of the carboxylic acid-terminated linear polymer. The following Examples 3 through 7 more particularly illustrate a flexible HMW epoxy resin useful in a present waterborne coating composition.

EXAMPLE 3

Preparation of Flexible HMW Epoxy Resin A

Liquid epoxy resin EPON 829 (508.2 parts by weight), carboxylic acid-terminated linear polymer A of Example 1 (122.8 parts by weight), Bisphenol A (281.8 parts by weight) and ethylene glycol monobutyl ether (6 parts by weight) were charged into a three-necked vessel equipped with stirrer, condenser, and a nitrogen inlet. The resulting reaction mixture was heated under a nitrogen blanket to about 155° C. A reaction exotherm then raised the temperature of the reaction mixture to about 175° C. within about 15 minutes. After the exotherm, the reaction mixture was maintained at about 177° C. for about 40 minutes. Then, 0.6 parts by weight of a phosphonium catalyst (RS 1201, available from Shell Chemical Co., Houston, Tex.) was added to the reaction mixture. The reaction temperature then was maintained at about 177° C. for four additional hours. Next, the reaction mixture was cooled to about 150° C., and finally 635 parts by weight ethylene glycol monobutyl ether was added to the reaction mixture to provide a reaction product including 54% by weight solids of the flexible HMW epoxy resin A. The EEW of the flexible HMW epoxy resin A, based on solids, was 9,200. The $M_w$ and $M_n$ of the flexible HMW epoxy resin A was 40,000 and 13,800, respectively, as determined by gel permeation chromatography. The Tg of the flexible HMW epoxy resin A was 68° C.

EXAMPLE 4

Preparation of Flexible HMW Epoxy Resin B

The procedure set forth in Example 3 was repeated except that after cooling the reaction mixture to 150° C., 316 parts by weight ethylene glycol monobutyl ether was added to the reaction mixture to provide a reaction product including 68% by weight solids of the flexible HMW epoxy resin B. The flexible HMW epoxy resin B had an similar EEW, $M_w$, $M_n$ and Tg as the flexible HMW epoxy resin A of Example 3.

EXAMPLE 5

Preparation of Flexible HMW Epoxy Resin C

Following the same procedure set forth in Example 3, flexible HMW epoxy resin C was prepared from 556.2 parts by weight liquid epoxy resin EPON 829, 291 parts by weight carboxylic acid-terminated linear polymer A of Example 1, and 304.3 parts by weight Bisphenol A. The resultant flexible HMW epoxy resin C had an EEW of 8,000, and a $M_w$ and $M_n$ of 21,000 and 5,460, respectively, as determined by gel permeation chromatography. The Tg of the flexible HMW epoxy resin was 47° C.

EXAMPLE 6

Preparation of Flexible HMW Epoxy Resin D

Following the same procedure set forth in Example 3, flexible HMW epoxy resin D was prepared from 726 parts by weight liquid epoxy resin EPON 829, 175 parts by weight carboxylic acid-terminated linear polymer A of Example 1, and 402.6 parts by weight Bisphenol A, in the presence of 15 parts by weight ethylene glycol monobutyl ether. After the reaction was completed, the reaction mixture was cooled to 150° C., followed by the addition of 120 parts by weight polypropylene glycol 1025, available from Union Carbide Corp. Danbury, Conn., 100 parts by weight ethylene glycol monobutyl ether, and 345 parts by weight n-butanol to provide a reaction product having 70% by weight solids of the flexible HMW epoxy resin D. The flexible HMW epoxy resin D had an EEW of 11,660, and a $M_w$ and $M_n$ of 40,000 and 13,800, respectively, as determined by gel permeation chromatography. The Tg of flexible HMW epoxy resin D was not determined, but is expected to be slightly less than 68° C., the Tg exhibited by the flexible HMW epoxy resin A of Example 3, because of the plasticizing effect of polypropylene glycol 1025 present in the flexible HMW epoxy resin D.

EXAMPLE 7

Preparation of Flexible HMW Epoxy Resin E

Following the procedure set forth in Example 3, flexible HMW epoxy resin E was prepared from 556.2 parts by weight liquid epoxy resin EPON 829, 160 parts by weight polyester B of Example 2, 304.3 parts by weight Bisphenol A in the presence of 125 parts by weight ethylene glycol monobutyl ether. After the reaction was completed, the reaction mixture was cooled to 125° C. Then 283 parts by weight n-butanol was added to the reaction mixture to reduce solids content of the reaction mixture to 70% by weight. The EEW of flexible HMW epoxy resin E was 15,000, and the $M_w$ and $M_n$ of the flexible HMW epoxy resin were 20,000 and 4,800, respectively, as determined by gel permeation chromatography. The Tg of flexible HMW epoxy resin E was 36° C.

Flexible HMW epoxy resins also were prepared from a polyester manufactured from neopentyl glycol and adipic acid. These flexible HMW epoxy resins had a Tg of 42° C. to 78° C. The Tg varied with the amount of polyester included in the flexible HMW epoxy resin over the range of about 8% to about 25% by weight, respectively.

(b) Medium Molecular Weight Epoxy Resin

In addition to a flexible HMW epoxy resin, a present waterborne coating composition includes about 5% to about 70%, and preferably about 15% to about 60%, by weight of nonvolatile material, of a MMW epoxy resin. To achieve the full advantage of the present invention, a waterborne coating composition includes about 30% to about 50%, by weight of nonvolatile material, of a MMW epoxy resin. The MMW epoxy resin can be either aromatic or aliphatic. Preferred MMW epoxy resins are polyglycidyl ethers of bisphenol A. The MMW epoxy resins include about 1.3 to about 2, and preferably about 2, epoxy equivalents.

A useful MMW epoxy resin has an EEW of about 1,500 to about 5,000, and preferably about 2,000 to about 4,000. A useful MMW epoxy resin has a weight average molecular weight ($M_w$) of about 2,000 to about 10,000. Exemplary MMW epoxy resins include, but are not limited to, DER 664, DER 667, DER 668 and DER 669, all available from Dow Chemical Co., Midland, Mich. and EPON 1004, EPON 1007 and EPON 1009, all available from Shell Chemical Co., Houston, Tex. The MMW epoxy resin also can be modified with a liquid epoxy, a carboxylic acid, or other oligomers or polymers.

A MMW epoxy resin, incorporated into a waterborne coating composition in an amount of about 5% to about 70% by weight of nonvolatile material, provides a sufficient number of crosslinking sites such that a waterborne coating composition can be essentially free of a phenolic resin, an aminoplast or a similar crosslinking agent without adversely affecting the chemical and physical properties of a cured coating composition. Consequently, by essentially eliminating a phenolic resin and an aminoplast from a waterborne coating composition, a cured coating composition does not impart an adverse taste to foods or beverages that contact the cured coating composition because the source of free formaldehyde has been eliminated. A cured coating composition also demonstrates excellent physical properties, such as scratch resistance, adhesion and flexibility.

A MMW epoxy resin provides a sufficient number of crosslinking sites such that a cured coating composition has excellent barrier properties (i.e., exhibits excellent corrosion control). As will be demonstrated more fully hereinafter, a cured coating composition including a flexible HMW epoxy resin, a resin having pendant carboxylic acid groups and a fugitive base, but without a MMW epoxy resin, did not demonstrate sufficient chemical resistance, and therefore is not as useful as a coating composition for food or beverage containers.

(c) Resin Having Pendant Carboxylic Acid Groups

In addition to a flexible HMW epoxy resin and a MMW epoxy resin, a waterborne coating composition also includes about 5% to about 70%, and preferably about 10% to about 50%, by weight of nonvolatile material, of a resin having pendant carboxylic acid groups. To achieve the full advantage of the present invention, a waterborne coating composition includes about 10% to about 35% by weight of nonvolatile material of a resin having pendant carboxylic acid groups.

A resin having pendant carboxylic acid groups includes about 0.7 to about 5.5 milliequivalents (meq) of carboxylic acid groups per gram (g) of the resin. As will be demonstrated more fully hereinafter, a resin having pendant carboxylic acid groups is prepared by conventional free radical polymerization processes during the preparation of a waterborne coating composition of the present invention. Alternatively, a resin having pendant carboxylic acid groups can be prepared, then added to a waterborne coating composition of the present invention.

A resin having pendant carboxylic acid groups typically is a homopolymer or a copolymer including an $\alpha,\beta$-unsaturated carboxylic acid, like acrylic acid or methacrylic acid. The $\alpha,\beta$-unsaturated carboxylic acid conventionally is copolymerized with a vinyl or an acrylic monomer, like styrene or ethylene. Suitable $\alpha,\beta$-unsaturated carboxylic acid monomers include, for example, acrylic acid, methacrylic acid, crotonic acid, itaconic acid, maleic acid, mesaconic acid, citraconic acid, fumaric acid, and mixtures thereof.

Polymerizable vinyl and acrylic monomers suitable for copolymerization with an $\alpha,\beta$-unsaturated carboxylic acid include, for example, aromatic and aliphatic compounds including vinyl moieties and esters and amides of $\alpha,\beta$-unsaturated carboxylic acids. Nonlimiting examples of suitable vinyl monomers include styrene and halostyrenes; isoprene; conjugated butadiene; $\alpha$-methylstyrene; vinyl toluene; vinyl naphthalene; the methyl, ethyl, propyl, isopropyl, butyl, isobutyl, pentyl, isoamyl, hexyl, ethylhexyl and lauryl acrylates, methacrylates and crotonates; dimethyl maleate, dibutyl fumarate and similar diesters of $\alpha,\beta$-unsaturated dicarboxylic acids; and mixtures thereof. Other suitable polymerizable vinyl monomers include vinyl chloride, acrylonitrile, acrylamide, methacrylamide, methacrylonitrile, vinyl acetate, vinyl propionate, vinyl stearate, isobutoxymethyl acrylamide, and the like.

The preferred vinyl monomers are styrene, methyl acrylate, ethyl acrylate, butyl acrylate, acrylic acid, methacrylic acid, and mixtures thereof. The most preferred vinyl monomers are styrene, methacrylic acid, acrylic acid, and mixtures thereof.

If a resin having pendant carboxylic acid groups is prepared during the preparation of a waterborne coating composition, a free radical initiator also is present. Preferably, the free radical initiator is a peroxide-type catalyst. Exemplary peroxide-type catalysts include, but are not limited to, cumene hydroperoxide, benzoyl hydroperoxide, t-butyl perbenzoate, t-butyl peroxide, lauroyl peroxide, methyl ethyl ketone peroxide, chlorobenzoyl peroxide, di-t-butyl hydroperoxide, t-butyl peroxy isopropyl carbonate, and peroxy-3,3,5-trimethylcyclohexane. Azo compounds, like for example azobis(isobutyrontrile), 2,2'-azobis(2-amidinopropane)-dihydrochloride, 2,2' -azobis(isobutyramide)dihydrate, also are useful free radical initiators.

The weight average molecular weight of a resin having pendant carboxylic acid groups is not particularly limited, but generally is at least about 1,500, and preferably at least about 3,000. A resin having pendant carboxylic acid groups, after neutralization with a fugitive base, acts as an emulsifier for other waterborne coating composition ingredients, like the epoxy resins, and helps provide a stable waterborne composition by maintaining phase stability of the waterborne coating composition. A resin having pendant carboxylic acid groups also provides crosslinking sites for a waterborne coating composition during cure.

(d) Fugitive Base

A waterborne coating composition of the present invention also includes a fugitive base. A fugitive base is added to neutralize the carboxylic acid groups on a resin having pendant carboxylic acid groups, and thereby provide an emulsifier for a waterborne coating composition. A minor portion of the fugitive base may interact with epoxy functionalities present in a waterborne coating composition to provide $\beta$-hydroxy quaternary ammonium functionalities, which also assist in emulsification of composition ingredients.

A fugitive base is included in a sufficient amount such that about 20% to about 100% of the carboxylic acid groups present on a resin having pendant carboxylic acid groups are neutralized. An excess amount of fugitive base does not adversely affect a waterborne coating composition, but the excess amount of fugitive base provides no advantages and therefor is wasted. A fugitive base preferably is present in an amount sufficient to neutralize at least about 35% to about 50% of the carboxylic acid groups present in a waterborne coating composition. The precise amount of fugitive base added to the composition is determined from the acid number of the polymer system and from the basicity of fugitive base.

A fugitive base is a relatively volatile compound that is expelled from a waterborne coating composition during cure. Accordingly, a waterborne coating composition, during cure, reverts to a more water insoluble form and therefore provides a cured coating composition that exhibits excellent chemical resistance and excellent blush resistance.

A fugitive base usually is a primary, secondary or tertiary amine, either aromatic or aliphatic, or a primary, secondary or tertiary alkanolamine, or an ammonium, alkylammonium hydroxide, or arylammonium hydroxide, or mixtures thereof. Nonlimiting examples of a fugitive base include ammonium hydroxide, a tetraalkylammonium hydroxide, wherein an alkyl group has one to about 4 carbon atoms (e.g., tetramethylammonium hydroxide), monoethanolamine, dimethylamine, methyldiethanolamine, benzylamine, diisopropylamine, butylamine, piperazine, dimethylethanolamine, diethylethanolamine, diethanolamine, morpholine, N-methylmorpholine, N-ethylmorpholine, triethylamine, 2-dimethylamine-2-methyl-1-propanol, 2-amino-2-methyl-1-propanol, piperidine, pyridine, dimethylaniline, and similar amines and alkanolamines, and mixtures thereof.

(e) Optional Polymeric Diol

To achieve the full advantage of the present invention, a waterborne coating composition includes 0% to about 10%, and preferably 0% to about 5%, by weight of nonvolatile material, of a polymeric diol. A polymeric diol is included to provide additional hydroxyl groups for crosslinking and to improve the physical properties of a waterborne coating composition. The polymeric diol reduces the surface tension of a waterborne coating composition, and thereby improves the ability of a waterborne coating composition to coat the metal substrate.

Exemplary polymeric diols useful in a waterborne coating composition include, but are not limited to, a polyoxyethylene glycol, a polyoxypropylene glycol, a polyoxy(ethylene-propylene) glycol, a polyester diol, styrene-butadiene diols, acrylic diols, a polyurethane diol, a 1,4-polybutadiene diol, and similar polymeric diols, and mixtures thereof. A polymeric diol has a sufficiently high molecular weight such that the polymeric diol essentially is not volatilized during cure of a waterborne coating composition. The polymeric diol therefore has a weight average molecular weight ($M_w$) of at least about 600, and preferably about 1,200 to about 3,000.

(f) Optional Crosslinking Agents

A waterborne coating composition of the present invention does not require a crosslinking agent, such as a phenolic resin or an aminoplast, that conventionally is included in epoxy-based coating compositions. However, a waterborne coating composition can include 0% to about 20%, by weight of nonvolatile material, of a phenolic resin or an aminoplast, or similar crosslinking agent, without adversely affecting the waterborne coating composition.

The taste of some foods or beverages packaged in metal containers, such as beer, is adversely affected by the presence of a phenolic resin or an aminoplast crosslinking agent in the coating on the interior of the metal container. Therefore, such foods and beverages preferably are packaged in containers having interior coatings absent such crosslinking agents. Accordingly, a present waterborne coating composition preferably includes 0% to about 0.5%, and most advantageously 0% to about 0.25%, by weight of nonvolatile material, of an optional phenolic resin or aminoplast crosslinking agent. Within this range, the optional crosslinking agent does not adversely affect a waterborne coating composition, a cured coating composition resulting therefrom, or a food or beverage that contacts a cured coating composition. Such a result is surprising because epoxy-based coatings typically include at least 1%, usually 5% to 10%, and up to about 20%, by weight of a phenolic resin as a crosslinking agent and to impart desired physical properties to the epoxy-based coating composition and cured coating composition resulting therefrom. A present waterborne coating composition provides a cured coating composition suitable for the interior of metal containers for foods and beverages even in the essential absence of a phenolic resin, aminoplast or similar crosslinking agent.

Generally, a phenolic resin optionally included in the present composition is a condensation product resulting from a reaction between a phenol and formaldehyde, and has a low weight average molecular weight in the range of about 1,000 to about 8,000, and preferably from about 3,000 to about 5,000. Phenol or essentially any other compound including a hydroxyphenyl moiety can be used as the phenol component of the phenolic resin. Nonlimiting examples of suitable phenol compounds include phenol, cresylic acid and bisphenol A. Bisphenol A is the preferred phenol component of the phenolic resin.

Similarly, an aminoplast can be used as the optional crosslinking agent. An aminoplast generally is a low molecular weight partially or fully alkylated condensation product, like urea-formaldehyde, melamine-formaldehyde and benzoguanamine-formaldehyde resins.

(g) Other Optional Ingredients

A waterborne coating composition of the present invention also can include other optional ingredients that do not adversely affect the waterborne coating composition or a cured coating composition resulting therefrom. Such optional ingredients are known in the art, and are included in a waterborne coating composition to enhance composition esthetics; to facilitate manufacturing, processing, handling and application of the composition; and to further improve a particular functional property of a waterborne coating composition or a cured coating composition resulting therefrom.

Such optional ingredients include, for example, dyes, pigments, extenders, fillers, additional anticorrosion agents, flow control agents, thixotropic agents, dispersing agents, antioxidants, adhesion promoters, light stabilizers, and mixtures thereof. Conventionally, a nonionic or an anionic surfactant is included in a waterborne coating composition to improve flow properties. Each optional ingredient is included in a sufficient amount to serve its intended purpose, but not in such an amount to adversely affect a waterborne coating composition or a cured coating composition resulting therefrom.

(h) Carrier

A present waterborne coating composition is an aqueous composition, but also includes about 0.5 to about 2.5 pounds VOC per gallon of the composition minus water. In general, the volatile organic compounds included in a waterborne coating composition have sufficient volatility to evaporate essentially entirely from the waterborne coating composition during the curing process, such as during heating at about 350° F. to about 500° F. for about 3 minutes to about 5 minutes.

The volatile organic compounds are included as a portion of the carrier to help dissolve, disperse and emulsify composition ingredients, and thereby provide a more stable composition. The volatile organic compounds also are included to improve the physical properties of the composition, like surface tension, flow out during the bake and viscosity, and thereby provide a composition that is easier to apply and that provides a more uniform cured coating. The volatile organic compounds improve the flow properties of a waterborne coating composition and facilitates spraying of a waterborne coating composition.

Present-day commercial waterborne coating compositions have a high VOC, usually in an amount of about 3 to about 5 lb/gal of the composition minus water. Such high VOC pose toxicological problems to coatings manufacturers and to coatings applicators, and pose environmental problems in general. In accordance with an important feature of the present invention, a present waterborne composition includes about 0.5 to about 2.5 lb VOC per gallon of composition minus water, thereby substantially alleviating the toxicological and environmental problems posed by prior waterborne coating compositions. Surprisingly, a waterborne coating composition of the present invention, including such a low VOC, is phase stable and provides uniform cured coatings.

Numerous volatile organic compounds can be included in a present waterborne coating composition in an aggregate amount of about 0.5 to about 2.5 lb/gal of the composition minus water. Suitable volatile organic compounds have a sufficiently low vapor pressure to resist evaporation during storage and a sufficiently high vapor pressure to be evaporated from the waterborne coating composition during cure. Exemplary, nonlimiting volatile organic compounds include, but are not limited to, the methyl, ethyl, propyl, butyl, hexyl or phenyl ether of ethylene glycol, diethylene glycol, triethylene glycol, propylene glycol or dipropylene glycol; ethylene glycol methyl ether acetate; ethylene glycol ethyl ether acetate; ethylene glycol butyl ether acetate; diethylene glycol ethyl ether acetate; diethylene glycol butyl ether acetate; propylene glycol methyl ether acetate; dipropylene glycol methyl ether acetate; n-butanol; hexyl alcohol; hexyl acetate; methyl n-amyl ketone; butylene glycol; propylene glycol; diisobutyl ketone; methyl propyl ketone; methyl ethyl ketone; methyl isobutyl ketone; 2-ethoxyethyl acetate; t-butyl alcohol; amyl alcohol; 2-ethylhexyl alcohol; cyclohexanol; isopropyl alcohol; and similar organic solvents, and mixtures thereof.

A preferred volatile organic compound is n-butanol because a flexible HMW epoxy resin is easily dispersed in n-butanol; a resin having pendant carboxylic acid groups is readily prepared in n-butanol; and n-butanol is easily removed by azeotropic distillation to provide a waterborne coating composition having a low amount of VOC.

A carrier also can include a relatively low amount of a nonpolar organic compound, such as up to about 10% by total weight of the carrier, without adversely affecting a waterborne coating composition, either prior to or after curing. Exemplary nonpolar organic compounds include a chlorinated hydrocarbon, an aliphatic hydrocarbon or an aromatic hydrocarbon, like toluene, benzene, xylene, mineral spirits, kerosene, naphtha, heptane, hexane, and similar hydrocarbons, and combinations thereof.

A carrier is included in the composition in a sufficient amount to provide a waterborne coating composition including about 10% to about 40%, and preferably about 15% to about 35%, by weight of the composition, of the total weight of (a), (b), (c), (d) and, if present, (e) and (f). To achieve the full advantage of the present invention, a waterborne coating composition includes about 20% to about 30% by weight of the composition, of the total weight of (a), (b), (c), (d) and, if present, (e) and (f).

The amount of carrier included in a waterborne coating composition is limited only by the desired, or necessary, rheological properties of a waterborne coating composition. Usually, a sufficient amount of carrier is included in a waterborne coating composition to provide a composition that can be processed easily, that can be applied to a metal substrate easily and uniformly, and that is sufficiently evaporated from a waterborne coating composition during cure within the desired cure time.

Therefore, essentially any carrier comprising a major portion of water and a minor portion of volatile organic compounds is useful in the present waterborne coating composition as long as the carrier adequately disperses, emulsifies and/or solubilizes the composition components; is inert with respect to interacting with composition components and thereby adversely affecting the stability of the coating composition or the ability of the coating composition to effectively cure; and evaporates quickly, essentially entirely and relatively rapidly to provide a cured coating composition that inhibits the corrosion of a metal substrate, that does not adversely affect a food or beverage that contacts the cured coating composition, and that demonstrates sufficient physical properties, like adhesion and flexibility, for use as a coating on the interior or exterior of a container.

A waterborne coating composition of the present invention is prepared by admixing a flexible HMW epoxy resin and a MMW epoxy resin, then either preparing a resin having pendant carboxylic acid groups in situ, in the presence of the epoxy resin mixture, or adding a preformed resin having pendant carboxylic acid groups to the mixture of the flexible HMW epoxy resin and the MMW epoxy resin. A fugitive base then is added to the resulting mixture, and finally water and organic solvents are added to adjust the amount of nonvolatile material in the waterborne coating composition to a predetermined level. Optional ingredients can be added to the waterborne coating composition either prior to or after the addition of water or organic solvents.

To demonstrate the usefulness of a waterborne coating composition of the present invention, the following Examples and Comparative Examples were prepared, then applied to a metal substrate, and finally cured to provide a coated metal substrate. The coated metal substrates then were tested, comparatively, for use as a food or beverage container. The cured coatings were tested for an ability to inhibit corrosion of a metal substrate; for adhesion to the metal substrate; for chemical resistance; for flexibility; for an ability to impart taste to a packaged food or beverage; and for scratch and mar resistance.

The following Comparative Examples 8 through 10 are similar to the coating compositions disclosed in Fan U.S. Pat. No. 4,374,875 and Johnson et al. U.S. Pat. No. 4,954,553. Accordingly, the compositions of Comparative Examples 8–10 do not include a MMW epoxy resin. The compositions of Comparative Examples 8–10 differ from Fan U.S. Pat. No. 4,374,875 and Johnson et al. U.S. Pat. No. 4,954,553 in that the compositions of Comparative Examples 8–10 include a flexible HMW epoxy resin, as disclosed herein, whereas the compositions disclosed in the prior patents incorporate a HMW epoxy resin that is not flexibilized. The following Examples 11 through 16 illustrate important features and embodiments of a waterborne composition of the present invention, and illustrate methods of manufacturing a waterborne coating composition of the present invention.

COMPARATIVE EXAMPLE 8

Coating Composition Without a Medium Molecular Weight Epoxy Resin

The flexible HMW epoxy resin A of Example 3 (550 parts by weight) was charged into a three-necked vessel equipped with a stirrer. The flexible HMW epoxy resin A was heated to about 121° C. under a nitrogen blanket, then a blend of 9.9 parts by weight styrene, 23.7 parts by weight methacrylic acid and 1.1 parts by weight benzoyl peroxide initiator was added dropwise to the heated flexible HMW epoxy resin A over a period of one hour. After the addition, the resulting mixture was held at about 125° C. for one hour. After cooling the mixture to about 96° C., a blend of 24.4 parts by weight dimethylaminoethanol and 24.4 parts by weight deionized water was added to the mixture over a period of 10 minutes, followed by the dropwise addition of 560 parts by weight deionized water over a one hour period. The waterborne coating composition was a stable dispersion having the following physical properties: nonvolatile matter (NVM)—25%, viscosity—524 cps (centipoise), pH—8.8, Tg—78° C., and surface tension—29 dynes/cm. The VOC of the composition was 3.9 lbs/gal minus water.

COMPARATIVE EXAMPLE 9

Coating Composition Without a Medium Molecular Weight Epoxy Resin

The flexible HMW epoxy resin B of Example 4 (375 parts by weight) was charged into an identical vessel as described in Comparative Example 8. The flexible HMW epoxy resin B was heated to about 121° C. under a nitrogen blanket, then a blend of 13.5 parts by weight styrene, 31.5 parts by weight methacrylic acid and 1.5 parts by weight of benzoyl peroxide initiator was added dropwise to the heated flexible HMW epoxy resin B over a period of one hour. After the addition, the resulting mixture was held at about 125° C. for one hour. After cooling the mixture to about 96° C., a blend of 24 parts by weight dimethylaminoethanol and 24 parts by weight deionized water was added to the mixture over a period of 10 minutes, followed by the dropwise addition of 850 parts by weight deionized water over a one hour period. During the water addition, an additional 8 parts by weight dimethylaminoethanol and 85 parts by weight n-butanol were added to facilitate emulsification. The waterborne coating composition was stable dispersion having the following physical properties: NVM—21.6%, viscosity—270 cps, pH 8.1, Tg—76° C., and surface tension—26.5 dynes/cm. The VOC of the composition was 3.9 lbs/gal minus water.

COMPARATIVE EXAMPLE 10

Coating Composition Without a Medium Molecular Weight Epoxy Resin

The coating composition of Comparative Example 9 was heated to remove n-butanol by azeotropic distillation. The resulting waterborne coating composition was a stable dispersion having following physical properties: NVM—25%, viscosity—315 cps, Tg—74° C., and surface tension—31.9 dynes/cm. The VOC of the composition was 3.1 lbs/gal minus water.

EXAMPLE 11

Waterborne Coating Composition

The flexible HMW epoxy resin B of Example 4 (155 parts by weight), a MMW epoxy resin (EPON 1009) (150 parts by weight), and n-butanol (76 parts by weight) were charged to an identical vessel as described in Comparative Example 8. The mixture was heated to about 121° C. under a nitrogen blanket, then a blend of 13.5 parts by weight styrene, 31.5 parts by weight methacrylic acid and 1.5 parts by weight of benzoyl peroxide initiator, was added dropwise to the heated mixture over a period of one hour. After the addition, the resulting mixture was held at about 125° C. for two hours. After cooling the mixture to about 96° C., a blend of 32 parts by weight dimethylaminoethanol and 32 parts by weight deionized water was added to the mixture over a period of 10 minutes, followed by the dropwise addition of 750 parts by weight of deionized water over a one hour period. A stable waterborne dispersion resulted. The waterborne dispersion then was heated to remove n-butanol by azeotropic distillation. The resulting waterborne coating composition was a stable dispersion having the following physical properties: NVM—23.4%, viscosity—287 cps, pH—7.7, Tg—86° C., and surface tension—34.4 dynes/cm. The VOC of the waterborne coating composition was 2.3 lbs/gal minus water.

EXAMPLE 12

Waterborne Coating Composition

The procedure set forth in Example 11 was repeated, except only 24 parts by weight dimethylaminoethanol was added to the cooled mixture. After removing essentially all of the n-butanol by azeotropic distillation, an additional amount of deionized water was added to the mixture to reduce the viscosity. The resulting waterborne coating composition was a stable dispersion having the following physical properties: NVM—18.7%, viscosity—172 cps, and pH 7.3. The VOC of the waterborne coating composition was 2.1 lbs/gal minus water.

EXAMPLE 13

Waterborne Coating Composition

The flexible HMW epoxy resin B of Example 4 (136 parts by weight), a MMW epoxy resin (EPON 1009) (132 parts by weight) and n-butanol (65 parts by weight) were charged into an identical vessel as described in Comparative Example 8. The mixture was heated to about 121° C. under a nitrogen blanket, then a blend of 22.5 parts by weight styrene, 52.5 parts by weight methacrylic acid and 3.0 parts by weight of benzoyl peroxide initiator was added dropwise to the heated mixture over a period of one hour. After the addition, the resulting mixture was held at about 125° C. for one hour. Then 53.5 parts by weight n-butanol was added to the mixture. After cooling the mixture to about 96° C., 19 parts by weight deionized water was added to the mixture, followed by the addition of a blend of 19 parts by weight dimethylaminoethanol and 19 parts by weight deionized water over a period of 10 minutes. Then 695 parts by weight deionized water was added dropwise to the mixture over a one hour period. A stable waterborne dispersion resulted. The waterborne dispersion then was heated to remove n-butanol by azeotropic distillation. The resulting waterborne coating composition was a stable dispersion having the following physical properties: NVM—25.9%, viscosity—149 cps, pH—65, Tg—77° C., and surface tension—42.3 dynes/cm. The VOC of the waterborne coating composition was 1.7 lbs/gal minus water.

EXAMPLE 14

Waterborne Coating Composition

The flexible HMW epoxy resin C of Example 5 (136 parts by weight), a MMW epoxy resin (EPON 1009) (132 parts by weight), and n-butanol (65 parts by weight) were charged into an identical vessel as described in Comparative Example 8. The mixture was heated to about 121° C. under a nitrogen blanket, then a blend of 22.5 parts by weight styrene, 52.5 parts by weight methacrylic acid and 3.0 parts by weight of benzoyl peroxide initiator was added dropwise to the heated mixture over a period of one hour. After the addition, the resulting mixture was held at about 125° C. for one hour, then 50 parts by weight of n-butanol was added to the mixture. After cooling the mixture to about 96° C., 19 parts by weight deionized water was added to the mixture, followed by the addition of a blend of 19 parts by weight dimethylaminoethanol and 19 parts by weight deionized water over a period of 10 minutes. Then 820 parts by weight deionized water was added dropwise to the mixture over a one hour period. A stable waterborne dispersion resulted. The dispersion was heated to remove n-butanol by azeotropic distillation. The resulting waterborne coating composition was a stable dispersion having the following physical properties: NVM—25.8%, viscosity—69 cps, pH—6.5, Tg—76° C., and surface tension—42.7 dynes/cm. The VOC of the waterborne coating composition was 1.2 lbs/gal minus water.

EXAMPLE 15

Waterborne Coating Composition

The flexible HMW epoxy resin D of Example 6 (146 parts by weight), a MMW epoxy resin (EPON 1009) (132 parts by weight), and n-butanol (65 parts by weight) were charged into an identical vessel as described in Comparative Example 8. The mixture was heated to about 121° C. under a nitrogen blanket, then a blend of 22.5 parts by weight styrene, 52.5 parts by weight methacrylic acid and 3.0 parts by weight of benzoyl peroxide initiator was added dropwise to the heated mixture over a period of one hour. After the addition, the resulting mixture was held at about 125° C. for one hour, then 50 parts by weight n-butanol was added to the mixture. After cooling the mixture to about 96° C., 19 parts by weight deionized water was added to the mixture, followed by the addition of a blend of 19 parts by weight dimethylaminoethanol and 19 parts deionized water over a period of 10 minutes. Then 860 parts by weight deionized water was added dropwise to the mixture over a one hour period. A stable waterborne dispersion resulted. The waterborne dispersion was heated to remove n-butanol by azeotropic distillation. The resulting waterborne coating composition was a stable dispersion having the following physical properties: NVM—26.7%, viscosity—49 cps, pH—6.5, and Tg—76° C. The VOC of the waterborne coating composition was 1.1 lbs/gal minus water.

EXAMPLE 16

Waterborne Coating Composition

The flexible HMW epoxy resin E of Example 7 (136 parts by weight), a MMW epoxy resin (EPON 1009) (132 parts by weight), and n-butanol (65 parts by weight) were charged into an identical vessel as described in Comparative Example 8. The mixture was heated to about 121° C. under a nitrogen blanket, then a blend of 22.5 parts by weight styrene, 52.5 parts by weight methacrylic acid and 3.0 parts by weight of benzoyl peroxide initiator was added dropwise to the heated mixture over a period of one hour. After the addition, the resulting mixture was held at about 125° C. for one hour, then 50 parts by weight n-butanol was added to the mixture. After cooling the mixture to about 96° C., 19 parts by weight deionized water was added to the mixture, followed by the addition of a blend of 19 parts by weight dimethylaminoethanol and 19 parts by weight deionized water over a period of 10 minutes. Then 820 parts by weight deionized water was added dropwise to the mixture over a one hour period. A stable waterborne dispersion resulted. The waterborne dispersion was heated to remove n-butanol by azeotropic distillation. The resulting waterborne coating composition was a stable dispersion having the following physical properties: NVM—26.1%, viscosity—35 cps, and pH—6.5. The VOC of the waterborne coating composition was 1.0 lbs/gal minus water.

The compositions of Examples 11–16 each include a flexible HMW epoxy resin, a MMW epoxy resin, a resin having pendant carboxylic acid groups and a fugitive base. Furthermore, each of the compositions of Examples 11–16 include about 1 to about 2.3 lb VOC per gallon of the composition minus water, and have a surface tension less than 45 dynes/cm. The waterborne coating compositions of Examples 11–16 therefore have a sufficiently low surface tension to effectively wet a aluminum substrate.

The surface tension can be reduced by the addition of an anionic or nonionic surfactant. The waterborne coating composition then can effectively wet other metal substrates, like tin-plated steel, that have a surface tension of about 30 to 35 dynes/cm and are more difficult to wet than aluminum. The addition of a surfactant to reduce the surface tension also permits an easier application of the waterborne coating composition to aluminum substrates. A waterborne coating composition of the present invention therefore demonstrates the advantage of effectively wetting a metal substrate to provide a smooth, uniform film.

The compositions of Examples 11–16 and Comparative Examples 8–10 each were applied to a metal substrate, and then cured to provide a coated metal substrate. The coated metal substrates then were tested, comparatively, for use as the interior surface of a food or beverage container. As will be demonstrated more fully hereinafter, a cured coating composition resulting from curing a waterborne coating composition of the present invention is suitable as the interior coating of a metal container for food or beverages. Surprisingly, a present waterborne coating composition provided excellent cured coating compositions in the absence of a phenolic resin or aminoplast crosslinking agent.

In particular, a waterborne coating composition of the present invention is applied to a metal substrate, then cured for a sufficient time at a sufficient temperature, such as for about 3 to about 5 minutes at about 350° F. to about 500° F., to provide an adherent cured coating composition on the metal substrate. The coated metal substrate then is shaped into a container or other metal article.

Therefore, the compositions of Examples 11-16 and Comparative Examples 8-10 each were individually applied to a clean, untreated aluminum substrate in a sufficient amount to provide a cured film thickness of about 0.1 mil. Each composition was reduced to a solids content of about 10% to about 26% by weight with deionized water before applying the composition to the aluminum substrate as a thin film. After applying a composition of Examples 11-16 or a composition of Comparative Examples 8-10 to an aluminum substrate, the composition was cured at 380° F. for about 3 minutes.

Each of the cured coating compositions had a smooth, glossy appearance and was defect free. Each cured coating composition of Comparative Examples 8-10 and Examples 11-16 had a pencil hardness in the range of 2 H to 4 H. Cured coating compositions having a pencil hardness in the range of 2 H to 6 H are considered hard coatings by persons skilled in the art. The results of other comparative tests performed on the cured coatings of Examples 11-16 and Comparative Examples 8-10 are illustrated in Table 1.

The present waterborne coating compositions consistently have exhibited coating properties at least equal to current commercial compositions for similar end uses. For example, the compositions of Examples 11-16, after application to a metal substrate and subsequent curing, performed at least as well as present day epoxy-based compositions having a high VOC and including a phenolic crosslinking agent. Such a result is unexpected because a waterborne coating composition of the present invention does not include a phenolic resin crosslinking agent. Furthermore, because no phenolic resin or aminoplast is present, no free formaldehyde is present in the film and no free formaldehyde is emitted as a volatile compound during preparation, application, cure, or product packaging in containers having an interior or exterior surface coated with a composition of the present invention. Accordingly, a waterborne composition of the present invention alleviates the toxicological and environmental concerns associated with high VOC and formaldehyde-containing compositions, alleviates the taste problems associated with compositions incorporating a phenolic resin crosslinking agent, and provides a cured coating composition that exhibits properties at least equal to present day can coating compositions.

TABLE 1

Comparative Tests of Cured Coating Compositions

| Example or Comparative Example | NVM[1] | Viscosity[2] | MEK Rub[3] | Blush[4] Resistance | Adhesion[5] |
|---|---|---|---|---|---|
| 8 | 21.6 | NR | <10 | 2 | 5 |
| 9 | 20 | 58" | <10 | 3 | 5 |
| 10 | 20 | 32" | <10 | 2 | 0 |
| 11 | 10 | 12" | 50+ | 0 | 0 |
| 12 | 10 | 13" | 50+ | 0 | 0 |
| 13 | 18 | 20" | 50+ | 0 | 0 |
| 14 | 20 | 16" | 25 | 2 | 0 |
| 15 | 21 | 14" | 50+ | 0 | 0 |
| 16 | 26 | 15.4" | 50+ | 0 | 0 |

[1]NVM - % nonvolatile material of the composition as applied to the aluminum substrate;
[2]Ford viscosity, #4 spindle;
[3]methyl ethyl ketone double rubs to achieve film failure;
[4]0 - no blush; 5 - severe blush; measured by immersion in 1% boiling Joy surfactant solution for 30 minutes at 100° C.;
[5]0 - no adhesion loss; 5 - complete adhesion loss; measured by cross hatch adhesion test after the blush resistance test.

The data summarized in Table 1 illustrate that a waterborne coating composition of the present invention provides a cured coating composition useful as the interior or exterior coating of a food or beverage container. In contrast, the compositions of Comparative Examples 8 through 10, each lacking a MMW epoxy resin, provided a cured coating composition that failed standard coatings tests.

In particular, the MEK rub test measures resistance of a cured coating to chemical attack. In the MEK rub test, cheesecloth saturated with methyl ethyl ketone (MEK) is rubbed back and forth against a coated aluminum panel using hand pressure. A rub back and forth is designated as one "double rub" In this test, the cured coating is rubbed until the MEK dissolves or otherwise disrupts the cured coating. Typically, a cured coating passes the MEK rub test if the coating is unaffected by fifty double rubs with the MEK saturated cloth.

As illustrated in Table 1, each of the cured coatings of Comparative Examples 8-10 was dissolved in less than 10 double rubs with the MEK saturated cloth. In contrast, each of the cured coating compositions of the present invention, except for Example 14, was unaffected by an excess of 50 double rubs in the MEK rub test. Accordingly, a cured coating composition of the present invention has excellent resistance to chemical attack and can be used as the coating for the interior surface of a food or beverage container.

With respect to the waterborne coating composition of Example 14, a cured coating composition derived from the composition of Example 14 withstood only 25 double rubs with an MEK-saturated cloth because the flexible HMW epoxy resin C present in the composition of Example 14 included more than 25% by weight of the carboxylic acid-terminated linear polymer. Accordingly, the flexible HMW epoxy resin C provided, after cure, a softer coating that was more susceptible to chemical attack by MEK. Therefore, a flexible HMW epoxy resin present in a waterborne coating composition of the present invention includes 25% by weight, or less, of the carboxylic acid-terminated linear polymer.

It should be noted that the cured coating compositions of Comparative Examples 8-10 are very similar to the cured coating compositions of Examples 11-16, except the compositions of Comparative Examples 8-10 do not include a MMW epoxy resin. The cured coating compositions of Comparative Examples 8-10 also failed the MEK rub test. Therefore, it is theorized, but not relied upon herein, that the cured coating compositions of Comparative Examples 8-10 were not sufficiently crosslinked, and accordingly were susceptible to chemical attack by MEK. Therefore, a waterborne coating composition of the present invention includes about 5% to about 70% by weight of a MMW epoxy resin to provide additional crosslinking sites. The presence of a MMW epoxy resin in a waterborne coating composition also is important because a phenolic resin or an aminoplast crosslinking agent then can be omitted from the composition. Accordingly, the environmental and toxicological concerns associated with phenolic resin, aminoplast and similar crosslinking agents are essentially eliminated, and such crosslinking agents are not present to impart a formaldehyde taste to a food or beverage packaged in a container coated with the cured coating composition.

The cured coating compositions derived from Examples 11-16 also demonstrated an excellent blush resistance and an excellent adhesion compared to the cured coating compositions derived from Comparative Examples 8-10. The blush resistance test demonstrates the ability of a cured coating to resist attack by a hot detergent solution. Adhesion is tested by the crosshatch adhesion test wherein razor blades make perpendicular crosshatch patterns in a cured coating. Adhesive tape is applied to the crosshatch patterns, then the adhesive tape is removed at a 90° angle in a fast movement. The amount of cured coating remaining as the metal substrate then is determined.

The crosshatch adhesion test results illustrated in Table 1 demonstrate that a cured coating composition of the present invention maintains essentially complete adhesion to the metal substrate, whereas the cured coatings derived from Comparative Examples 8-10 maintain no adhesion. A coating composition for a metal container must demonstrate excellent adhesion and flexibility because metal containers are manufactured by first coating flat sheets of the metal substrate, then forming the coated sheets into a desired shape. Coatings having poor adhesion properties can separate from the metal substrate during the shaping process. A lack of adhesion therefore can adversely affect the ability of the cured coating composition to inhibit corrosion of the metal substrate. A present waterborne coating composition exhibits an excellent adhesion to a metal substrate, and therefore coating can be applied to a metal substrate, cured, and the metal substrate subsequently can be deformed without adversely affecting continuity of the coating film.

The coating compositions of Examples 11-16 also provided a cured coating composition having excellent flexibility. Flexibility is an important property of a cured polymeric coating because the metal substrate is coated prior to stamping or otherwise shaping the metal substrate into a desired metal article, such as a metal container. The coated metal substrate undergoes severe deformations during the shaping process, and if a coating lacks sufficient flexibility, the coating can form cracks or fractures. Such cracks result in corrosion of the metal substrate because the aqueous contents of the container have greater access to the metal substrate. Metal substrates coated with a present waterborne coating composition were deformed into the shape of a metal can. No cracks or fractures were observed. In addition, as previously described, a cured coating provided by a waterborne coating composition of the present invention is sufficiently adherent to the metal substrate, and remains sufficiently adherent during processing into a metal article, and therefore further enhances corrosion inhibition.

The comparative tests illustrated in Table 1 demonstrate that a cured coating composition of Examples 11-16 maintains adhesion to the metal substrate; is flexible; is sufficiently hard and therefore is scratch and mar resistant; resists blush; and resists chemical attack. Such a combination of advantages is unexpected for a low VOC, epoxy-based waterborne coating composition absent a phenolic agent or aminoplast crosslinking agent. In addition, a composition of the present invention can be cured over the temperature range of about 350° F. to about 500° F., thereby making a waterborne coating composition of the present invention useful in various coating processes without the need to adjust curing parameters. The above combination of advantages is necessary, or at least desirable, in a coating applied to the interior of food and beverage containers.

The properties demonstrated by a waterborne coating composition of the present invention, and a cured coating composition resulting therefrom, show that, contrary to prior teachings, a phenolic resin or aminoplast resin is not necessary to provide a cured epoxy-based coating composition useful for the interior or exterior of containers, and especially food and beverage containers. All known prior references required at least 1% by weight of a phenolic resin or aminoplast crosslinking agent to provide a useful coating. The elimination of the phenolic resin or aminoplast crosslinking agent is important in coatings used to coat the interior of food and beverage cans because free formaldehyde present in the crosslinking agent, either as a residual compound or as a result of curing, can adversely affect the food or beverage packaged in the can, especially sensitive foods or beverages like beer.

As an added advantage, a composition of the present invention can be cured over a relatively wide temperature range of about 350° F. to about 500° F., and over relatively wide time period of about 3 minutes to about 5 minutes, without adversely affecting the advantageous physical and chemical properties of the cured coating composition. A container manufacturer therefore does not have to design the coating process around the curing characteristics of the coating composition; nor does the coating manufacturer have to tailor the curing characteristics of the coating composition to a particular coating process. The present coating composition therefore has a more universal range of applications. Furthermore, the wide curing range and the chemical and physical properties demonstrated by the present coating compositions makes a waterborne coating composition useful for both the exterior and interior of can bodies and can ends. Conventionally, different coating compositions are used for the can body and can end, and for the exterior and interior of the container. This further expands the range of applications for the present composition.

The above described advantages make a waterborne coating composition of the present invention useful for application on the interior surface of a variety of metal articles, such as for the interior of metal containers for foods and beverages. A present waterborne coating composition is especially useful, after curing, as a coating on a metal container that holds taste sensitive food or beverages, like beer, because the waterborne coating composition is essentially free of a phenolic resin or aminoplast crosslinking agent.

Obviously, many modifications and variations of the invention as hereinbefore set forth can be made without departing from the spirit and scope thereof and therefore only such limitations should be imposed as are indicated by the appended claims.

What is claimed is:

1. A waterborne coating composition for application to a metal substrate comprising:
   (a) about 25% to about 90%, by weight of nonvolatile material, of a flexible high molecular weight epoxy resin having an epoxy equivalent weight of about 7,000 to about 20,000, said flexible high molecular weight epoxy resin comprising:
      (i) a liquid epoxy resin having an epoxy equivalent weight of about 150 to about 300,
      (ii) a carboxylic acid-terminated linear polymer, and
      (iii) a dihydric phenol,
   wherein the carboxylic acid-terminated linear polymer is present in a sufficient amount to provide a flexible high molecular weight epoxy resin having a Tg of about 30° C. to about 100° C.;
   (b) about 5% to about 70%, by weight of nonvolatile material, of a medium molecular weight epoxy resin having an epoxy equivalent weight of about 1,500 to about 5,000;
   (c) about 5% to about 70%, by weight of nonvolatile material, of a resin having pendant carboxylic acid groups, wherein the carboxylic acid groups are present in an amount of about 0.7 to about 5.5 meq/gm of the resin;
   (d) a fugitive base in an amount sufficient to neutralize about 20% to about 100% of the stoichiometric amount of the pendant carboxylic acid groups; and
   (e) a sufficient amount of a carrier comprising water and volatile organic compounds, such that the waterborne coating composition includes about 10% to about 40%, by weight of the composition, of the total weight of (a), (b), (c) and (d), and such that the composition includes about 0.5 to about 2.5 pounds VOC per gallon of the composition minus water, and wherein the composition is essentially free of a phenol-formaldehyde resin, an aminoplast, a carbodiimide compound and mixtures thereof.

2. The waterborne coating composition of claim 1 further comprising:
   (f) 0% to about 10%, by weight of nonvolatile material, of a polymeric diol.

3. The waterborne coating composition of claim 1 wherein the flexible high molecular weight epoxy resin has an epoxy equivalent weight of about 8,000 to about 18,000.

4. The waterborne coating composition of claim 1 wherein the flexible high molecular weight epoxy resin has a weight average molecular weight of about 20,000 to about 50,000.

5. The waterborne coating composition of claim 1 wherein the flexible high molecular weight epoxy resin has weight average molecular weight of about 30,000 to about 40,000.

6. The flexible high molecular weight epoxy of claim 1 wherein the carboxylic acid-terminated linear polymer is present in a sufficient amount to provide a flexible high molecular weight epoxy resin having a Tg of about 45° C. to about 80° C.

7. The flexible high molecular weight epoxy of claim 1 wherein the carboxylic acid-terminated linear polymer is present in an amount of about 5% to about 25% by weight of the flexible high molecular weight epoxy resin.

8. The flexible high molecular weight epoxy resin of claim 1 wherein the carboxylic acid-terminated linear polymer is a polyester, an acrylic-based polymer, a polybutadiene-based polymer, a styrene-butadiene based polymer, a styrene-butadiene-acrylonitrile terpolymer, or a mixture thereof.

9. The flexible high molecular weight epoxy resin of claim 1 wherein the carboxylic acid-terminated linear polymer is a polyester comprising a diol and a dicarboxylic acid.

10. The polyester of claim 9 wherein the polyester is hydrophobic and the dicarboxylic acid is an aromatic dicarboxylic acid or a combination of an aromatic dicarboxylic acid and an aliphatic dicarboxylic acid.

11. The polyester of claim 9 wherein the polyester is hydrophilic and the dicarboxylic acid is an aliphatic dicarboxylic acid.

12. The flexible high molecular weight epoxy resin of claim 1 wherein the dihydric phenol is a bis(hydroxyphenyl)alkane, a di(hydroxyphenyl) sulfone, a di(hydroxyphenyl) ether, and mixtures thereof.

13. The waterborne coating composition of claim 1 wherein the medium molecular weight epoxy resin has an epoxy equivalent weight of about 2,000 to about 4,000.

14. The waterborne coating composition of claim 1 wherein the medium molecular weight epoxy resin has a weight average molecular weight of about 2,000 to about 10,000.

15. The waterborne coating composition of claim 1 wherein the resin having pendant carboxylic acid groups is a homopolymer or a copolymer of an $\alpha,\beta$-unsaturated carboxylic acid.

16. The waterborne coating composition of claim 1 wherein the resin having pendant carboxylic acid groups has a weight average molecular weight of at least about 1,500.

17. The waterborne coating composition of claim 1 wherein the fugitive base is present in a sufficient amount to neutralize about 35% to about 50% of the stoichiometric amount of the pendant carboxylic acid groups.

18. The waterborne coating composition of claim 1 wherein the fugitive base has sufficient volatility to be expelled from the waterborne coating composition during a curing process and is selected from the group consisting of ammonium hydroxide, a primary amine, a secondary amine, a tertiary amine, an alkanolamine or an alkylammonium hydroxide.

19. The waterborne coating composition of claim 2 wherein the polymeric diol has a weight average molecular weight of at least about 600.

20. The waterborne coating composition of claim 1 including about one to about two pounds VOC per gallon of the composition minus water.

21. The waterborne coating composition of claim 1 further comprising a sufficient amount of a nonionic surfactant, an anionic surfactant or a mixture thereof to provide a composition having a surface tension of about 30 to about 35 dynes per centimeter.

22. The waterborne coating composition of claim 1 comprising:
   (a) about 30% to about 70%, by weight of nonvolatile material, of a flexible high molecular weight epoxy resin having an epoxy equivalent weight of about 7,000 to about 20,000;
   (b) about 15% to about 60%, by weight of nonvolatile material, of a medium molecular weight epoxy resin having an epoxy equivalent weight of about 1,500 to about 5,000;
   (c) about 10% to about 50%, by weight of nonvolatile material, of a resin having pendant carboxylic acid groups, wherein the carboxylic acid groups are present in an amount of about 0.7 to about 5.5 meq/gm of the resin;

(d) A fugitive base in an amount sufficient to neutralize about 35% to about 50% of the stoichiometric amount of the pendant carboxylic acid groups; and (e) a sufficient amount of a carrier comprising water and volatile organic compounds, such that the waterborne coating composition includes about 15% to about 35%, by weight of the composition, of the total weight of (a), (b), (c) and (d), and such that the composition includes about 0.5 to about 2.5 pounds VOC per gallon of the composition minus water.

23. The waterborne coating composition of claim 22 further comprising:

(f) 0% to about 10%, by weight of nonvolatile material, of a polymeric diol; and (g) 0% to about 0.25%, by weight by nonvolatile material, of a crosslinking agent.

24. The waterborne coating composition of claim 22 wherein the flexible high molecular weight epoxy resin comprises:

(i) a liquid epoxy resin having an epoxy equivalent weight of about 150 to about 300;

(ii) a carboxylic acid-terminated polyester; and (iii) a dihydric phenol, and wherein the carboxylic acid-terminated polyester is present in a sufficient amount to provide a flexible high molecular weight epoxy resin having a Tg of about 45° C. to about 80° C.

25. A method of coating a metal substrate comprising:

(i) applying a waterborne coating composition to at least one surface of the metal substrate, said waterborne coating composition comprising:

(a) about 25% to about 90%, by weight of nonvolatile material, of a flexible high molecular weight epoxy resin having an epoxy equivalent weight of about 7,000 to about 20,000;

(b) about 5% to about 70%, by weight of nonvolatile material, of a medium molecular weight epoxy resin having an epoxy equivalent weight of about 1,500 to about 5,000;

(c) about 5% to about 70%, by weight of nonvolatile material, of a resin having pendant carboxylic acid groups, wherein the carboxylic acid groups are present in an amount of about 0.7 to about 5.5 meq/gm of the resin;

(d) a fugitive base in an amount sufficient to neutralize about 20% to about 100% of the stoichiometric amount of the pendant carboxylic acid groups; and (e) a sufficient amount of a carrier comprising water and volatile organic compounds, such that the waterborne coating composition includes about 10% to about 40%, by weight of the composition, of the total weight of (a), (b), (c) and (d), and such that the composition includes about 0.5 to about 2.5 pounds VOC per gallon of the composition minus water; and (ii) heating the metal substrate having the waterborne coating composition applied thereon for a sufficient time and at a sufficient temperature to remove the fugitive base and the carrier from the composition and provide a crosslinked cured coating composition.

26. The method of claim 25 where the waterborne coating composition further comprises:

(f) 0% to about 10%, by weight of nonvolatile material, of a polymeric diol; and (g) 0% to about 20%, by weight by nonvolatile material, of a crosslinking agent.

27. The method of claim 25 wherein the waterborne coating composition is essentially free of a phenolic resin, an aminoplast, a carbodiimide compound and mixtures thereof.

28. The method of claim 25 wherein the metal substrate having the waterborne coating composition applied thereon is heated for about 3 minutes to about 5 minutes at a temperature of about 350° F. to about 500° F.

29. A metal article having at least one surface thereof coated with an adherent layer of a cured coating composition, said cured coating composition resulting from curing a waterborne coating composition comprising:

(a) about 25% to about 90%, by weight of nonvolatile material, of a flexible high molecular weight epoxy resin having an epoxy equivalent weight of about 7,000 to about 20,000;

(b) about 5% to about 70%, by weight of nonvolatile material, of a medium molecular weight epoxy resin having an epoxy equivalent weight of about 1,500 to about 5,000;

(c) about 5% to about 70%, by weight of nonvolatile material, of a resin having pendant carboxylic acid groups, wherein the carboxylic acid groups are present in an amount of about 0.7 to about 5.5 meq/gm of the resin;

(d) a fugitive base in an amount sufficient to neutralize about 20% to about 100% of the stoichiometric amount of the pendant carboxylic acid groups; and (e) a sufficient amount of a carrier comprising water and volatile organic compounds, such that the waterborne coating composition includes about 10% to about 40%, by weight of the composition, of the total weight of (a), (b), (c) and (d), and such that the composition includes about 0.5 to about 2.5 pounds VOC per gallon of the composition minus water.

30. The metal article of claim 29 wherein the waterborne coating composition further comprises:

(f) 0% to about 10%, by weight of nonvolatile material, of a polymeric diol; and (g) 0% to about 20%, by weight of nonvolatile material, of a crosslinking agent.

31. The metal article of claim 29 wherein the composition is essentially free of a phenolic resin, an aminoplast, a carbodiimide compound and mixtures thereof.

* * * * *